United States Patent Office 3,718,432
Patented Feb. 27, 1973

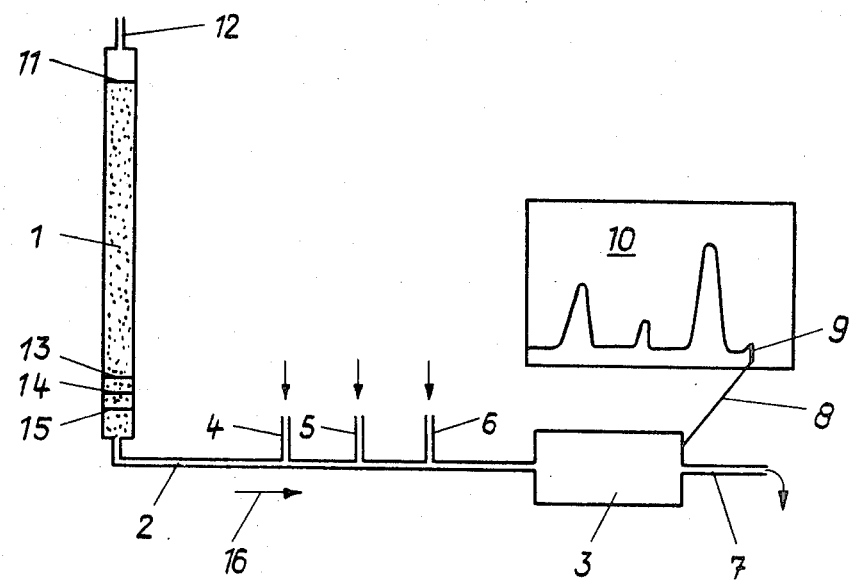

3,718,432
DETERMINATION OF AMMONIA AND ORGANIC AMINO COMPOUNDS
Marc Roth, 14 Petite Boissiere, Geneva, Switzerland
Filed Feb. 12, 1971, Ser. No. 114,788
Claims priority, application Switzerland, Feb. 17, 1970, 2,269/70
Int. Cl. G01n 21/38, 31/08, 33/16
U.S. Cl. 23—230 R  28 Claims

ABSTRACT OF THE DISCLOSURE

A process for the determination of ammonia and organic amino compounds having at least one primary amino group, in particular amino acids and their derivatives substituted on the carboxyl group, comprising the step of creating a fluorescent product by putting into contact the compound to be determined either with a compound of the Formula I:

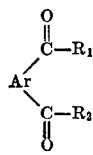

in which Ar indicates an aromatic radical, the —$COR_1$ and —$COR_2$ groups being attached to adjacent carbon atoms, and $R_1$ and $R_2$ are identical or different and represent hydrogen or an organic radical, and with a reducing agent, or with a reaction product of the said compound of Formula I and the reducing agent.

---

A known method of determining amino acids and polypeptides, by colorimetry, consists of using ninhydrine as reagent causing a colouration the intensity of which can be measured by photometry. This method is commonly employed, but for certain determinations, it would be useful to be able to employ a much more sensitive method enabling detection, or even determination, of quantities of the order of a fraction of a microgram of ammonia or organic amino compounds.

The present invention fulfills these desiderata. According to the invention, a process for the determination of ammonia and organic amino compounds, in particular amino acids (especially α-amino acids) and their derivatives substituted on the carboxyl group, comprises the step of creating a fluorescent product by putting into contact the compound to be determined either with a compound of Formula I:

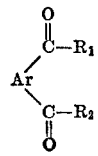

in which Ar indicates an aromatic radical, the —$COR_1$ and —$COR_2$ groups being attached to adjacent carbon atoms, and $R_1$ and $R_2$ are identical or different and represent hydrogen or an organic radical, and with a reducing agent, or with a reaction product of the said compound of Formula I and the reducing agent.

It has been observed that compounds of the above Formula I enable the creation of a fluorescence which is not only directly proportional to the quantity of compounds to be determined, but also indicate extremely low quantities of the compounds, of the order of a microgram. This fluorometry is much more sensitive than the known colorimetry method, and enables work to be carried out with quantities of material about 100 times less than by colorimetry.

The process according to the invention thus enables both qualitative and quantitive determinations. It is applied, for example, to the determination of glycocoll, valine, serine, alanine, phenylalanine, glutamine, ethyl leucinate, and leucyl-glycyl-glycine.

The invention also concerns a reagent for carrying out the above-indicated process comprising either at least one compound of Formula I and a reducing agent, or the reaction product of the compound of Formula I and a reducing agent.

The compound of Formula I and the reducing agent can either be stored together in one container, but isolated from one another, or can be mixed together and located in the same recipient.

The reagent can also comprise the reaction product of the compound of Formula I and the reducing agent. It has been established that this reaction product, when it is put into contact with the compounds to be determined, creates a fluorescence identical to that produced by the use of the compound of Formula I and the reducing agent.

In the compound of Formula I, the aromatic radical Ar can be a phenylene radical ($C_6H_4$=). Excellent results are obtained by using as compound of Formula I, either ortho-phthalaldehyde of Formula II:

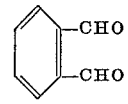

or ortho-diacetyl-benzene of Formula III:

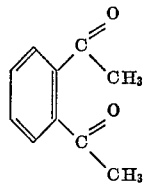

The reducing agent used in the process of the invention, and forming part of the reagent, can be a thiol, in particular a mercapto-alcohol, for example, 2-mercaptoethanol of Formula IV HS—$CH_2$—$CH_2$—OH. It can also be a borohydride, such as an alkali borohydride, for example potassium borohydride of Formula V K($BH_4$) or sodium borohydride.

Upon carrying out the process of the invention, it is advantageous for the fluorescent product to be created in a medium the pH of which is comprised between 6 and 13, preferably between 8 and 10, for example pH 9. It is not necessary to heat the said medium. The process thus has the advantage that it can be carried out cold.

So as to keep the pH within the above-indicated limits, the reagent according to the invention can comprise, in addition to either compound of Formula I and reducing agent, or their reaction product, a buffer of pH comprised between 6 and 13, preferably between 8 and 10. In the reagent, the ratio between the compound of Formula I and the reducing agent can advantageously be one equivalent of the said compound for one to three equivalents of the reducing agent.

Two examples which show the sensitivity of the process of the invention are now given.

EXAMPLE 1

$1/100$ ml. of an aqueous solution of glycocoll containing 0.1 mg./ml. is firstly added to 3 ml. of an aqueous solution of sodium borate of pH 9 acting as a buffer and containing 0.005 mol/litre of borate, then 0.1 ml. of a solution of 10 mg./ml. of orthophthalaldehyde in methanol. The components are mixed and 0.1 ml. of a solution of 1 mg./ml. of potassium borohydride $K(BH_4)$ is added. Using ultraviolet radiation, a blue fluorescence is observed. If the above indicated operations are executed with increasing quantities of α-amino acid or amino acid derivatives, it is observed that the intensity of fluorescence obtained is a function of these quantities.

EXAMPLE 2

1/100 ml. of an aqueous solution of alanine containing 0.01 mg./ml. is mixed with 3 ml. of an aqueous solution of sodium borate of pH 9 acting as a buffer and containing 0.5 mol/litre of borate, then 0.1 ml. of a solution of 10 mg./ml. of orthophthalaldehyde in methanol, and 0.1 ml. of an aqueous solution of potassium borohydride of 1 mg./ml. are added and mixed. The fluorescence of the solution obtained is measured in a spectro-fluorometer using wavelengths of 335 nm. for excitation and 415 nm. for emission. The intensity of fluorescence represents more than double that of a sample prepared in the same manner, but excluding alanine.

The process according to the invention can be carried out using an apparatus such as that shown, schematically and by way of example, in the single figure of the accompanying drawings.

This apparatus comprises a separating column 1 at the top of which substances to be analyzed are introduced. This column can operate, for example, by ion exchange or chromatography and is connected at its lower part by a conduit 2 to a continuous flux fluorometer 3. The latter has an outlet conduit 7. The fluorometer 3 actuates a tracing needle 8 the point 9 of which is adapted to trace a curve on a mobile recording sheet 10.

The process according to the invention, to determine the presence or absence of various amino acids contained in a substance, and to determine the quantities thereof, can be carried out by means of the described apparatus as follows.

The substance can for example be a biological preparation, a hydrolyzed protein or peptide. It is introduced up to 11 at the top of the column 1. An acid buffer solution is added by the tube 12. During descent in the column 1, the various acids separate from one another as schematically indicated by the layers 13, 14 and 15. These acids pass one after the other into the conduit 2 and move along it in the direction of arrow 16; this flow can take place by gravity or by pumping. An alkaline solution of sodium borate is introduced by a tube 4 to bring the pH of the liquid passing along the conduit 2 to the desired value, between pH 6 and 13. A solution of orthophthalaldehyde in methanol is added by tube 5 and an aqueous solution of potassium borohydride is added by tube 6. These solutions mix with the amino acids. The mixture passes through the fluorometer 3 and is evacuated by the outlet conduit 7.

In the fluorometer 3, the intensity of fluoroscence is measured and the results of these measurements are recorded on the sheet 10 by means of the point 9 of the needle 8. The curve thus recorded indicates the zones of fluorescence, in the form of peaks, the surface areas of which are proportional to the respective quantities of amino acids which pass separately through the fluorometer 3.

In a variant, the two tubes 5 and 6 can be replaced by a single tube through which the compound of Formula I and the reducing agent are added at the same time into the conduit 2. This can be the case when the reducing agent is 2-mercapto-ethanol and the compound of Formula I ortho-phthalaldehyde.

Three examples of reagent according to the invention are now given.

EXAMPLE 3

Two flasks are located in a single container: one flask contains a powder of potassium borohydride, the other contains a liquid prepared by dissolving orthophthalaldehyde in methanol and adding to this solution an aqueous solution of sodium borate. The contents of the two flasks are mixed shortly before carrying out a determination.

EXAMPLE 4

The reagent is formed by a single liquid which is a solution in which the solvent is water and methanol containing ortho-phthalaldehyde, 2-mercapto-ethanol and a buffer, such as sodium borate.

This solution contains, per litre, 100 ml. of methanol, 5 g. of ortho-phthalaldehyde, 4 ml. of 2-mercapto-ethanol and 0.05 mol of sodium borate; its pH is adjusted to 9 by means of boric acid.

EXAMPLE 5

In this example, the reagent contains the reaction product of the compound of Formula I and the reducing agent.

This reagent can be prepared as follows: 5 g. of orthophthalaldehyde are dissolved in 150 ml. of methanol. The solution obtained is mixed with 800 ml. of an aqueout buffer solution of sodium borate of pH 9, then 20 ml. of 2-mercapto-ethanol are added and the components are stirred. After allowing it to rest for 5 minutes, an extraction is carried out with 500 ml. of n-butanol. The extract is evaporated under vacuum of 12 mm. of mercury with heating in a water-bath. The residue, whilst still viscous, is placed on a chromatography column filled with silica gel and chloroform. Chromatography is carried out with a mixture containing 18 parts of chloroform, one part of ethyl acetate and one part of ethanol. The eluate contains a first fraction absorbing ultraviolet light: this is ortho-phthalaldehyde. This fraction is removed. A second fraction absorbing ultraviolet light then appears. It contains the reagent which gives off a fluorescence with amino acids at pH 9, which is verified by a test sample. This fraction is collected and evaporated to dryness. The residue, dissolved in ethanol and protected from the air in a firmly closed flask, gives a purified reagent solution.

What is claimed is:

1. A process for the determination of ammonia and organic amino compounds having at least one primary amino group in a substance, comprising the step of creating a fluorescent product by putting into contact a sample of said substance with ortho-phthalaldehyde or ortho-diacetyl-benzene and an alkali metal borohydride in a medium the pH of which is comprised between 6 and 13, and the step of detecting or measuring the created fluorescence.

2. A process according to claim 1 in which the alkali metal borohydride is sodium or potassium borohydride.

3. A process for the determination of ammonia and organic amino compounds having at least one primary amino group in a substance, comprising the step of creating a fluorescent product by putting into contact a sample of said substance with ortho-phthalaldehyde or ortho-diacetyl-benzene and a thiol, in a medium the pH of which is comprised between 6 and 13, and the step of detecting or measuring the created fluorescence.

4. A process according to claim 3 in which the thiol is a mercapto alcohol.

5. A process according to claim 4 in which the mercapto alcohol is 2-mercapto-ethanol.

6. A process for the determination of ammonia and organic amino compounds having at least one primary amino group in a substance, comprising the step of creating a fluorescent product by putting into contact a sample of said substance with the reaction product of ortho-phthalaldehyde or ortho-diacetylbenzene with a thiol, in a medium the pH of which is comprised between 6 and 13, and the step of detecting or measuring the created fluorescence.

7. A process according to claim 6 in which the thiol is a mercapto-alcohol.

8. A process according to claim 7 in which the mercapto-alcohol is 2-mercapto-ethanol.

9. A process for the determination of ammonia and organic amino compounds having at least one primary amino group in a substance, comprising the step of creating a fluorescent product by putting into contact a sample of said substance with the reaction product of ortho-phthalaldehyde with a mercapto alcohol, in a medium the pH of which is comprised between 6 and 13, and the step of detecting or measuring the created fluorescence.

10. A process according to claim 9 in which the mercapto alcohol is 2-mercapto-ethanol.

11. A reagent for the determination by fluorescence of ammonia and organic amino compounds having at least one primary amino group, comprising at least ortho-phthalaldehyde or ortho-diacetyl-benzene and an alkali metal borohydride.

12. A reagent according to claim 11 in which the alkali metal borohydride is sodium or potassium borohydride.

13. A reagent according to claim 11 in which the ortho-phthalaldehyde or the ortho-diacetyl-benzene is stored isolated from the alkali metal borohydride.

14. A reagent according to claim 11 comprising for one equivalent of ortho-phthalaldehyde or ortho-diacetyl-benzene, from one to three equivalents of alkali metal borohydride.

15. A reagent according to claim 11 comprising a buffer of pH between 6 and 13.

16. A reagent for the determination by fluorescence of ammonia and organic amino compounds having at least one primary amino group, comprising at least ortho-phthalaldehyde or ortho-diacetyl-benzene and a thiol.

17. A reagent according to claim 16 in which the ortho-phthalaldehyde or the ortho-diacetyl-benzene is stored isolated from the thiol.

18. A reagent according to claim 16 comprising for one equivalent of ortho-phthalaldehyde or ortho-diacetyl-benzene, from one to three equivalents of thiol.

19. A reagent according to claim 16 comprising a buffer of pH between 6 and 13.

20. A reagent according to claim 16 in which the thiol is a mercapto alcohol.

21. A reagent according to claim 20 in which the mercapto alcohol is 2-mercapto-ethanol.

22. A reagent for the determination by fluorescence of ammonia and organic amino compounds having at least one primary amino group, comprising at least the reaction product of ortho-phthalaldehyde or ortho-diacetyl-benzene with a thiol.

23. A reagent according to claim 22 comprising a buffer of pH between 6 and 13.

24. A reagent according to claim 22 in which the thiol is a mercapto alcohol.

25. A reagent according to claim 24 in which the mercapto alcohol is 2-mercapto-ethanol.

26. A reagent for the determination by fluorescence of ammonia and organic amino compounds having at least one primary amino group, comprising at least the reaction product of ortho-phthalaldehyde with a mercapto alcohol.

27. A reagent according to claim 26 in which the mercapto alcohol is 2-mercapto-ethanol.

28. A reagent according to claim 26 comprising a buffer of pH between 6 and 13.

References Cited

Wartenberg, T.: Chemical Abstracts, vol. 51, pp. 5882–3 (1957).

Shelley, W. B. et al.: Chemical Abstracts, vol. 64 pp. 20166–7 (1966).

Merck Index, 7th edition, pp. 838, 947 (1963).

Juhlin, L. et al.: Chemical Abstracts, vol. 65 pp. 7613–4 (1966).

Reimschneider, R. et al.: Chemical Abstracts, vol. 58, p. 5975 (1963).

MORRIS O. WOLK, Primary Examiner

R. M. REESE, Assistant Examiner

U.S. Cl. X.R.

23—230 B; 252—408, 301.2